US008444732B2

(12) United States Patent
Bratton

(10) Patent No.: US 8,444,732 B2
(45) Date of Patent: May 21, 2013

(54) VANE-TYPE SEPARATOR

(75) Inventor: Rodney Allan Bratton, Calgary (CA)

(73) Assignee: 800839 Alberta Limited, Calgary AB (CA)

( * ) Notice: Subject to any disclaimer, the term of this patent is extended or adjusted under 35 U.S.C. 154(b) by 374 days.

(21) Appl. No.: 12/822,105

(22) Filed: Jun. 23, 2010

(65) Prior Publication Data

US 2010/0326026 A1 Dec. 30, 2010

Related U.S. Application Data

(60) Provisional application No. 61/220,070, filed on Jun. 24, 2009.

(51) Int. Cl.
*B01D 45/00* (2006.01)
(52) U.S. Cl.
USPC ............. 55/440; 55/441; 55/442; 55/443; 55/444; 55/445; 55/462; 55/464; 55/465; 55/DIG. 37; 96/356; 96/358

(58) Field of Classification Search
USPC ........... 55/440–445, 462, 464–465, DIG. 37; 96/356, 358
See application file for complete search history.

(56) References Cited

U.S. PATENT DOCUMENTS

| | | | |
|---|---|---|---|
| 1,678,844 A * | 7/1928 | Bradshaw | 55/444 |
| 1,803,854 A * | 5/1931 | Kniskern | 95/272 |
| 1,928,706 A | 10/1933 | Sillers | |
| 2,348,933 A | 3/1940 | Seeley | |
| 2,643,736 A * | 6/1953 | Smith | 55/440 |
| 2,973,056 A | 2/1961 | Sillers, Jr. | |
| 3,358,580 A | 12/1967 | Freese et al. | |
| 3,405,511 A | 10/1968 | Halter et al. | |
| 3,517,486 A | 6/1970 | Golden | |
| 3,520,116 A * | 7/1970 | Good | 55/440 |
| 3,849,095 A * | 11/1974 | Regehr | 55/394 |
| 3,870,488 A * | 3/1975 | Arndt et al. | 55/440 |
| 3,899,427 A * | 8/1975 | Connelly et al. | 210/521 |
| 3,912,471 A * | 10/1975 | Cotton, Jr. | 55/440 |
| 3,938,972 A * | 2/1976 | Sugimura | 55/440 |
| 3,950,156 A * | 4/1976 | Kall | 55/440 |
| 3,961,922 A | 6/1976 | Leung | |
| 4,016,835 A * | 4/1977 | Yarden et al. | 122/483 |
| 4,053,292 A * | 10/1977 | Schneider et al. | 96/245 |
| 4,141,706 A * | 2/1979 | Regehr | 55/437 |
| 4,175,938 A * | 11/1979 | Regehr et al. | 55/440 |
| 4,198,215 A * | 4/1980 | Regehr | 55/440 |
| 4,322,234 A * | 3/1982 | Mock | 55/440 |
| 4,430,101 A * | 2/1984 | Sixsmith | 55/440 |

(Continued)

FOREIGN PATENT DOCUMENTS

JP 2002-126429 5/2002

*Primary Examiner* — In Suk Bullock
*Assistant Examiner* — Dung H Bui
(74) *Attorney, Agent, or Firm* — Heslin Rothenberg Farley & Mesiti P.C.; Victor A. Cardona, Esq.

(57) ABSTRACT

A vane-type separator with pockets for removing solid and liquid particles entrained in a gaseous stream. Vanes are fabricated from a plurality of modular components which may be assembled to form vanes of varying lengths. The vanes include pockets with rounded leading edges to encourage particulate to impinge on the vane and move into the pockets by surface tension and aerodynamic forces. The vane-type separator allows for a higher gas stream velocity before particulate is found downstream of the vane-type separator.

13 Claims, 3 Drawing Sheets

U.S. PATENT DOCUMENTS

| | | | |
|---|---|---|---|
| 4,802,901 A * | 2/1989 | Wurz et al. | 55/440 |
| 5,104,431 A * | 4/1992 | Fewel, Jr. | 55/440 |
| 5,268,011 A * | 12/1993 | Wurz | 55/440 |
| 5,514,193 A * | 5/1996 | Schaal et al. | 96/356 |
| 6,083,302 A * | 7/2000 | Bauver et al. | 95/216 |
| 6,810,835 B2 * | 11/2004 | Ishiguro et al. | 122/34 |
| 6,852,146 B2 | 2/2005 | Holmes et al. | |
| 7,618,472 B2 * | 11/2009 | Agnello et al. | 55/440 |
| 7,674,304 B2 * | 3/2010 | Krell et al. | 55/440 |
| 7,686,862 B1 * | 3/2010 | Daniel et al. | 55/440 |
| 2004/0007132 A1 * | 1/2004 | Holmes et al. | 95/272 |
| 2007/0137154 A1 * | 6/2007 | Agnello et al. | 55/440 |
| 2009/0101014 A1 * | 4/2009 | Baseotto | 95/272 |
| 2010/0199619 A1 * | 8/2010 | Buzanowski | 55/443 |

* cited by examiner

VANE-TYPE SEPARATOR

RELATED APPLICATION

This application is related to and claims the benefit of priority to U.S. application 61/220,070 filed Jun. 24, 2009 and incorporated herein by reference.

FIELD OF THE INVENTION

This application generally relates to separators for removing solid and liquid particles suspended in gaseous streams and more specifically to improved vane structures allowing for increased gas velocity during separator operation.

BACKGROUND OF THE INVENTION

As is known, many chemical and industrial processes produce gaseous products which are removed via a gas stream. In addition to the gaseous products, solid particles or liquid droplets may be entrained within the gas stream and, as a result, it is often desirable to remove entrained solid and liquid particulate from a gas stream in order to produce a pure gaseous product.

A vane separator is often used to remove solid and liquid particulate from a gaseous stream. Typically, vane separators consist of a plurality of undulating parallel plates having pockets that provide narrow zig-zag passageways through which a gas stream is forced such that the flow of gas as well as the solid and liquid particulate rapidly changes direction several times as they pass through the narrow passageways. Solid and liquid particles have a higher density and mass than gas and are not able to rapidly change direction. As a result, particulates will impinge on the vane structures and collect inside vane pockets.

Forcing gas through a vane separator at a high velocity or forcing a gas with a high particulate content may cause particulate to escape from the outlet of a vane separator. As a result, particulate may be found downstream of a vane separator and the gas stream will not be pure. The maximum operating characteristics of a vane separator with respect to variables such as gas velocity or particulate content before particulate is found downstream of the vane separator is known as "breakthrough."

The narrow gaps between vanes, friction along vane surfaces and zig-zag configuration of a vane separator will also cause a drop in gas pressure from the inlet to the outlet. However, in many industrial and chemical applications of vane separators, it is desirable to minimize the pressure drop across a vane separator.

Furthermore, existing vane separators are also limited in the amount of solid/liquid particulate that they are able to collect along a surface given a particular gas pressure, particulate content and vane configuration. As a result, it is desirable to provide collection of particulate while requiring a minimum of vanes.

Further still, vane separators are often used in offshore applications such as on oil platforms or the like. Offshore applications require that equipment weigh as little as possible to decrease transportation costs and increase safety in extreme weather conditions. As a result, it is desirable to minimize the weight of a vane separator. Furthermore, it is desirable to use fewer components and less welding in the fabrication of vane separators in order to decrease manufacturing costs.

It is therefore an objective of the present invention to provide a lightweight vane separator enabled to provide improved collection of solid and liquid particulate while minimizing the gas pressure drop from the inlet to the outlet.

A review of the prior art reveals that a number of technologies have been used in the past for removing solid and liquid particles from a gaseous stream. For example, U.S. Pat. No. 3,405,511 discloses a vane-type mist eliminator having pocket-like channels extending along the length of the vanes.

U.S. Pat. No. 3,405,511 teaches a vane type separator having a plurality of vane subassemblies wherein gas flows from the bottom to the top.

U.S. Pat. No. 1,928,706 discloses a mist extractor unit consisting of a plurality of vertical zig-zag vanes that are provided with extensions for the purpose of creating pockets to entrap liquid particulate collected by the vertical vanes.

U.S. Pat. No. 3,517,486 teaches a vane-type separator having a plurality of vane subassemblies clamped together by bolts to separate particulate from a gas stream.

Other references include U.S. Pat. No. 2,973,056 which describes passing gas through a filter and U.S. Pat. No. 3,358,580 which describes arcuate separating traps.

While the prior art may provide a partial solution, each are limited in various ways as briefly described below.

In particular, past systems may be limited as they do not suggest or teach the advantages of having rounded leading edges on a particulate collecting pocket or a modular vane design without a continuous steel base strip. In addition, past systems do not teach the combined performance advantages of a system as described herein.

SUMMARY OF THE INVENTION

In accordance with the invention, there is provided a vane separator for removing particulates entrained in a gas stream comprising: an undulating vane for placement within a gas stream, the undulating vane having a plurality of adjacent pockets having pocket openings wherein each pocket opening includes a rounded leading edge for encouraging liquid droplets to enter a pocket opening and pocket.

In further embodiments, each pocket has a back end and the back end forms a rounded leading edge of an adjacent pocket.

The vane separator is preferably assembled from a plurality of rigid curved strips of material wherein each rigid curved strip includes a leading edge section, a second leading edge section, a downstream edge section, a rounded pocket edge section and an anchor edge section and wherein each of the leading edge section, downstream edge section and anchor edge section are parallel with respect to one another and the vane separator is assembled by directly connecting corresponding anchor edges with second leading edge sections to form each pocket.

The leading edge section is preferably angled with respect to the second leading edge section wherein the angle between the leading edge section and the second leading edge section is preferably 100-150 degrees and, more preferably, approximately 120 degrees.

The vane separator preferably does not include a central spine.

In further embodiments, each undulating vane has an upstream vane end and a downstream vane end and the upstream vane end includes an upstream leading edge configured to the undulating vane to define a first pocket adjacent the upstream vane end.

In another embodiment, each pocket includes an internal apex and each pocket opening is substantially aligned above the internal apex.

In another aspect of the invention, a vane separator system is provided formed from at least two vane separators for forming gas stream passages between adjacent undulating vanes wherein the separation between adjacent vane separators is substantially equal to or greater than the cross-sectional thickness of a pocket.

BRIEF DESCRIPTION OF THE DRAWINGS

The invention is described with reference to the accompanying figures in which.

DETAILED DESCRIPTION OF THE INVENTION

Figure 1:
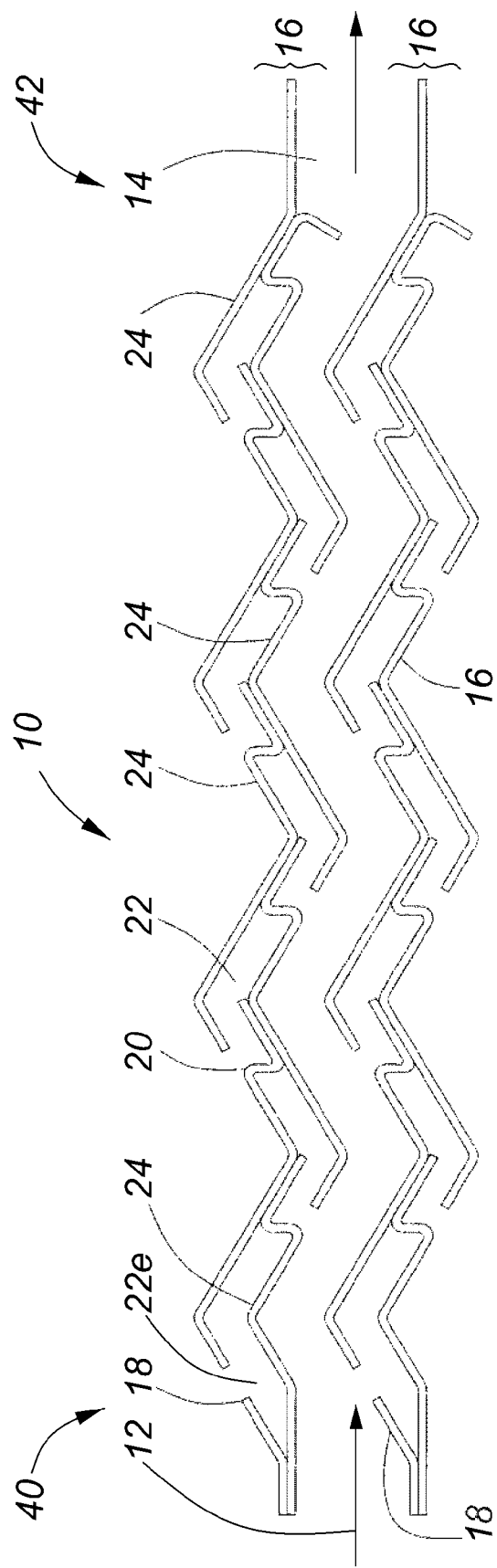
FIG. 1 shows a series of parallel vanes in a preferred embodiment of the present invention having a leading edge.

As used herein, the term "particulate" refers to any solid particles or any liquid droplets that may be found within a gas stream.

As used herein, the term "liquid carryover" refers to finding particulate downstream of a vane separator.

As used herein, the term "breakthrough" refers to the maximum operating characteristics of a vane separator such as gas velocity or particulate content before liquid carryover occurs.
Overview With reference to the figures, the present invention generally relates to a vane separator or demister 10 for the removal of liquid or solid particles from a gas stream. The device is particularly useful for removing particulate from various gases in chemical plants, petro-chemical plants, power generation plants and gas production, transmission and distribution systems. In accordance with known systems, the vane separator 10 generally includes a plurality of undulating vanes 16 arranged in parallel to form one or more gas passageways with inlets 12 and outlets 14.

Figure 2:
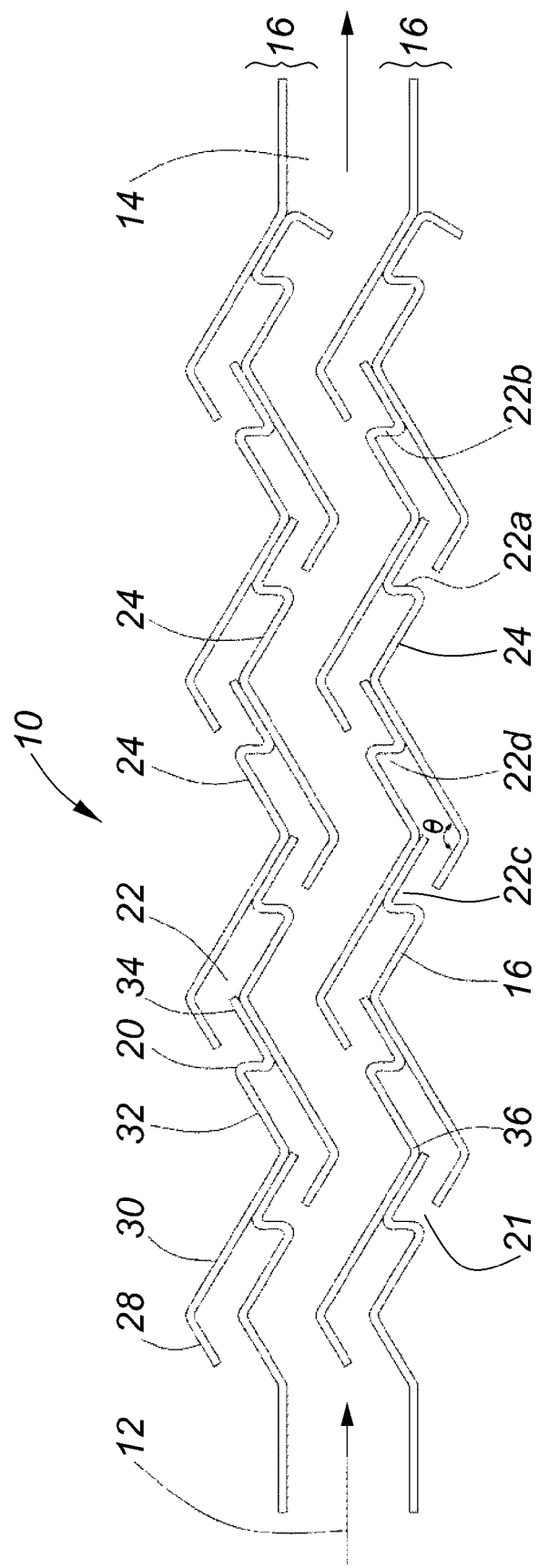
FIG. 2 shows a series of parallel vanes in a preferred embodiment of the present invention without a leading edge.

Vanes are typically oriented vertically and the gas stream travels from the inlet 12 to the outlet 14 as shown by the arrows in FIGS. 1-2. The gas stream enters the vanes through the inlet 12 wherein the undulations force the gas stream to take a tortuous or zig-zag path through the gas passageways, whereby the entrained liquid droplets impinge and cling to the vanes. The liquid droplets will be forced into the pockets 22 through pocket openings 21 because of the combination of a curved leading edge 20, and the aerodynamic forces and surface tension of the droplets adhering to the surfaces. The droplet are subsequently removed from the vane separator by gravity.
Vane Fabrication and Design As shown in FIGS. 1-2, vanes 16 are generally made of a plurality of curved sheet metal strips 24. Each curved sheet metal strip is connected to adjacent curved sheet metal strips 24 to form vanes of different lengths. The curved sheet metal strips may be attached together using a variety of known attachment methods such as welding or bolting.

Figure 3:
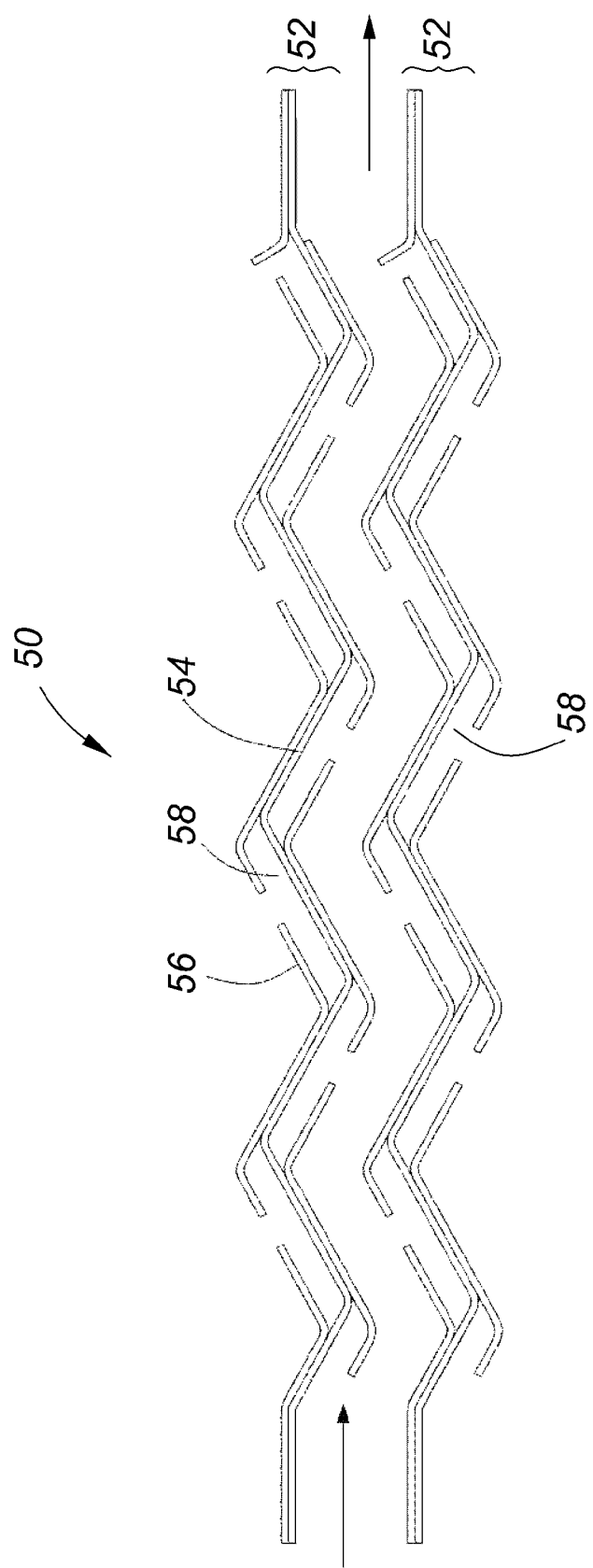
FIG. 3 shows a conventional vane type demister in accordance with the prior art.

In comparison and as shown in FIG. 3, conventional vane separators 50 are comprised of a plurality of parallel vanes 52. Vanes 52 are formed from a base strip or central spine of sheet metal 54 to which a plurality of metal vane extensions 56 are attached to form pockets 58. The vanes 52 are undulated to encourage liquid droplets to impinge on the vanes and collect in the pockets. In such a prior art system, the metal vane extensions are typically attached to the base sheet metal strip 54 by welding or other methods known to one of skill in the art.

Referring back to FIGS. 1-2, importantly, the present invention does not require a base strip or central spine for the fabrication of each vane 16. As a result, the elimination of the base strip or central spine reduces the amount of metal required to fabricate a vane 16 thereby decreasing the weight of a vane separator 10. Furthermore, the removal of the base strip or central spine generally enables an increased pocket 22 size for a given vane thickness thereby allowing for increased particulate collection. It is estimated that the monetary savings created by a design without a base strip or central spine is 20% less than conventional vane separator designs given current material costs.

In greater detail, in order to provide improved particulate collection, the present invention includes a rounded pocket edge 20 at the leading edge of each pocket opening 21, such that as small liquid droplets impinge on a vane surface, as a result of aerodynamic forces, the droplets will move towards a pocket 22 while remaining attached to the vane surface by surface tension. Accordingly, the rounded pocket edge 20 encourages water droplets to move inside a pocket where they may be collected. Without a rounded leading edge, water droplets may not become entrapped within a pocket 22 and instead be re-entrained in the gas stream.

As noted above, pockets 22 are formed from a plurality of curved sheet metal strips 24. Each curved sheet metal strip includes a leading edge section 28, a second leading edge section 30, a downstream edge section 32, a rounded pocket edge 20 and an anchor section 34. The leading edge section 28, downstream edge section 32 and anchor section 34 are generally parallel with respect to one another. As can be seen, the anchor section 34 of one strip is attached to the second leading edge section 30 of another curved sheet metal strip so as to form a pocket 22 between two adjacent curved sheet metal strips 24. Successive connections of curved sheet metal strips to one another allow the assembly of a vane 16.

Each pocket 22 is further characterized by a front end 22a and back end 22b that by virtue of the curved surfaces also define an upstream void 22c and downstream void 22d. As shown, each upstream void 22c is angled with respect to the downstream void 22d by an angle θ that defines an internal apex 36. The angle θ is typically 100-150 degrees with a preferred angle being approximately 120 degrees. The outer surfaces of each pocket 20 include the leading edge section 28, second leading edge section 30, and downstream edge 32.

With reference to FIG. 1, a preferred embodiment of the present invention includes an upstream leading edge 18 at the upstream end 40 of each vane to direct the flow of gas into the vane separator 10 and create a first pocket 22e. Upstream leading edges 18 further reduce gas turbulence, friction and otherwise allow for higher gas velocities within the vane separator 10. An upstream leading edge 18 does not add a significant amount of weight to a vane separator 10.

With reference to FIG. 2, an alternate embodiment of the present invention is shown without a leading edge 18 at the inlet 12 to a vane separator 18. In each embodiment, minor modifications can be made to specific curved sheet metal strips as may be desired to assist in manufacture or to adjust various performance properties.

As is known in the art, welding requires a significant amount of time and expense in the fabrication process for vane separators. Conventional vane separators such as those disclosed by U.S. Pat. No. 3,405,511 (FIG. 3) require spot or seam welding in 9 different places for a design with 7 pockets. Conversely, the present invention only requires welding in 7 places for a 7 pocket design. The reduced number of welds in the present invention provides increased cost savings and decreased manufacturing time. It is estimated that the present invention requires 22% less welding in the fabrication process than conventional vane separators.

Comparison Examples

A comparison between the present invention and the prior art was conducted using a conventional vane separator (as per FIG. 3) and vane separators of identical sizes as shown in FIG. 1. A mixture of air and water was used as the test stream and a 5 HP Variable Frequency Drive (VFD) blower was used to control air speed. Water was introduced into the test stream at 1000 psi through a plurality of nozzles that could be individually enabled or disabled. More specifically, the nozzles were atomizing type nozzles with a 0.006 inch orifice. The mist produced by the nozzles was observed to be very fine with a predicted particle size between 1 micron and 30 microns.

The testing protocol included increasing the velocity of the gas stream until breakthrough occurred. The gas velocity at which breakthrough occurred was determined by measuring the solid/liquid particle size of particulate using a Filtersense model LM 70 liquid mist monitor located downstream of the vane separator. The testing protocol further included taking a time dependant sample at a collection point at the outlet of the wind tunnel. The pressure differential between the inlet and outlet of a vane separator was measured using a manometer. The gas velocity was measured using a Omega Engineering FMA-906-V flow measurement probe.

When compared to the conventional vane separators (FIG. 3) and while using a low liquid to gas ratio, the present invention allows for an overall gas inlet velocity increase of 6% before breakthrough. With an increased liquid to gas ratio, the present invention allowed for a 21% increase of gas velocity in comparison with conventional vane separators.

When analyzing the pressure differential between the inlet and outlet of a vane separator, the present invention and conventional vane separators showed comparable pressure drops across the device.

When compared with conventional vane separators of the same dimensions and made from the same materials, the present invention is 19% lighter than conventional vane separators.

Vane separators may be fabricated from appropriate rigid materials including but not limited to sheet metal and plastics.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A vane separator for removing particulates entrained in a gas stream comprising:
   an undulating vane for placement within a gas stream, the undulating vane having a plurality of adjacent pockets having pocket openings wherein each pocket opening includes a rounded leading edge for encouraging liquid droplets to enter a pocket opening and pocket in which the vane separator is assembled from a plurality of rigid curved strips of material wherein each rigid curved strip includes:
   a leading edge section;
   a second leading edge section directly connected to the leading edge section;
   a downstream edge section directly connected to the second leading edge section;
   a rounded leading edge section directly connected to the downstream edge section; and
   an anchor edge section directly connected to the rounded leading edge section;
   wherein each of the leading edge section, downstream edge section and anchor edge section are parallel with respect to one another and the vane separator is assembled by directly connecting corresponding anchor edges with second leading edge sections to form each pocket; and
   wherein the rounded leading edge section is located between the downstream edge section and the anchor edge section.

2. The vane separator as in claim 1 wherein each pocket has a back end and the back end forms the rounded leading edge of an adjacent pocket.

3. The vane separator as in claim 1 wherein the leading edge section is angled with respect to the second leading edge section.

4. The vane separator as in claim 3 wherein the angle between the leading edge section and the second leading edge section is 100-150 degrees.

5. The vane separator as in claim 3 wherein the angle between the leading edge section and the second leading edge section is 120 degrees.

6. The vane separator as in claim 1 wherein each undulating vane has an upstream vane end and a downstream vane end and wherein the upstream vane end includes an upstream leading edge configured to the undulating vane to define a first pocket adjacent the upstream vane end.

7. The vane separator as in claim 1 wherein each pocket includes an internal apex and each pocket opening is substantially aligned above the internal apex.

8. The vane separator as in claim 2 wherein the leading edge section is angled with respect to the second leading edge section.

9. The vane separator as in claim 8 wherein the angle between the leading edge section and the second leading edge section is 100-150 degrees.

10. The vane separator as in claim 8 wherein the angle between the leading edge section and the second leading edge section is 120 degrees.

11. The vane separator as in claim 9 wherein each undulating vane has an upstream vane end and a downstream vane end and wherein the upstream vane end includes an upstream leading edge configured to the undulating vane to define a first pocket adjacent the upstream vane end.

12. The vane separator as in claim 11 wherein each pocket includes an internal apex and each pocket opening is substantially aligned above the internal apex.

13. A vane separator system formed from at least two vane separators as defined in claim 1 for forming gas stream passages between adjacent undulating vanes wherein the separation between adjacent vane separators is substantially equal to or greater than the cross-sectional thickness of a pocket.

* * * * *